United States Patent
Boss et al.

(10) Patent No.: US 8,645,915 B2
(45) Date of Patent: *Feb. 4, 2014

(54) DYNAMIC DATA RESTRUCTURING

(75) Inventors: Gregory Jensen Boss, Fork, UT (US); Yen-Fu Chen, Austin, TX (US); Rick Allen Hamilton, II, Charlottesville, VA (US); Hari Shankar, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/454,567

(22) Filed: Apr. 24, 2012

(65) Prior Publication Data

US 2012/0210207 A1    Aug. 16, 2012

Related U.S. Application Data

(63) Continuation of application No. 11/845,869, filed on Aug. 28, 2007, now Pat. No. 8,239,825.

(51) Int. Cl.
*G06F 7/04* (2006.01)
*G06F 9/44* (2006.01)
*G06F 17/24* (2006.01)
*G06F 17/30* (2006.01)

(52) U.S. Cl.
USPC .... 717/113; 717/110; 717/111; 707/999.202; 715/229; 715/255; 726/4

(58) Field of Classification Search
None
See application file for complete search history.

(56) References Cited

U.S. PATENT DOCUMENTS

| | | | |
|---|---|---|---|
| 5,228,121 A | 7/1993 | Fontaine et al. | |
| 6,070,177 A | 5/2000 | Kao et al. | |
| 7,287,218 B1 | 10/2007 | Knotz et al. | |
| 7,536,635 B2 * | 5/2009 | Racovolis et al. | 715/229 |
| 7,707,623 B2 | 4/2010 | Cicchitto et al. | |
| 7,770,123 B1 | 8/2010 | Meyer et al. | |
| 7,805,673 B2 * | 9/2010 | der Quaeler et al. | 715/255 |
| 2002/0032707 A1 | 3/2002 | Takeoka | |

(Continued)

OTHER PUBLICATIONS

Separating Change Control Duties to Comply with Sarbanes-Oxley Regulations, Newmerix Sarbanes-Oxley Best Practice Brief, Newmerix, 2005, 2 pages, [retrieved on Nov. 14, 2011], Retrieved from the Internet: <URL:http://hosteddocs.ittoolbox.com/new9.8.06.pdf>.*

Solworth, J., Approvability, ASIACCS, Mar. 21-24, 2006, Taipei, Taiwan, pp. 231-242, [retrieved on Mar. 22, 2012], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Shmeiser, Olsen & Watts; William Schniesser

(57) ABSTRACT

A data restructuring method and system. The method includes receiving by a computing system from a first user content data arranged in a first specified order and a command for tagging portions of the content data according to various parameters. The computing system assigns identification tags to the portions of the content data. The computing system presents the identification tags to the first user. The computing system receives from the first user, a selection of at least one of the identification tags. The computing system restructures the content data into a second specified order in response to the selection. The computing system receives a request for viewing the content data from a second user. The computing system presents to the second user, the content data in the second specified order.

20 Claims, 6 Drawing Sheets

(56) References Cited

U.S. PATENT DOCUMENTS

| | | |
|---|---|---|
| 2004/0143596 A1 | 7/2004 | Sirkin |
| 2004/0205645 A1 | 10/2004 | Hoffman |
| 2004/0205656 A1 | 10/2004 | Reulein et al. |
| 2005/0071755 A1 | 3/2005 | Harrington et al. |
| 2005/0204337 A1* | 9/2005 | Diesel et al. .............. 717/113 |
| 2006/0005165 A1* | 1/2006 | Alabi ........................ 717/113 |
| 2006/0048053 A1 | 3/2006 | Sembower et al. |
| 2007/0005665 A1* | 1/2007 | Vaitzblit et al. ............ 707/202 |
| 2007/0150862 A1* | 6/2007 | Naibo et al. ................ 717/110 |
| 2007/0240106 A1* | 10/2007 | Manson et al. ............. 717/110 |
| 2007/0250467 A1 | 10/2007 | Mesnik et al. |
| 2007/0266104 A1 | 11/2007 | Bolf et al. |
| 2007/0288890 A1* | 12/2007 | Wells ......................... 717/113 |
| 2008/0052668 A1* | 2/2008 | Craig et al. ................. 717/111 |
| 2008/0098484 A1 | 4/2008 | Cicchitto et al. |
| 2009/0025063 A1* | 1/2009 | Thomas ....................... 726/4 |
| 2009/0064101 A1 | 3/2009 | Boss et al. |

OTHER PUBLICATIONS

Office Action (Mail Date Jun. 7, 2011) for U.S. Appl. No. 11/845,869; filed Aug. 28, 2007; Confirmation No. 9443.
Amendment filed Sep. 7, 2011 in response to Office Action (Mail Date Jun. 7, 2011) for U.S. Appl. No. 11/845,869; filed Aug. 28, 2007; Confirmation No. 9443.
Final Office Action (Mail Date Nov. 18, 2011) for U.S. Appl. No. 11/845,869; filed Aug. 28, 2007; Confirmation No. 9443.
Amendment After Final filed Jan. 24, 2012 in response to Final Office Action (Mail Date Nov. 18, 2011) for U.S. Appl. No. 11/845,869; filed Aug. 28, 2007; Confirmation No. 9443.
Advisory Action (Mail Date Jan. 24, 2012) for U.S. Appl. No. 11/845,869; filed Aug. 28, 2007; Confirmation No. 9443.
Request for Continued Examination filed Jan. 30, 2012 for U.S. Appl. No. 11/845,869; filed Aug. 28, 2007; Confirmation No. 9443.
Notice of Allowance (Mail Date Mar. 29, 2012) for U.S. Appl. No. 11/845,869; filed Aug. 28, 2007; Confirmation No. 9443.

* cited by examiner

DYNAMIC DATA RESTRUCTURING

This application is a continuation application claiming priority to Ser. No. 11/845,869, filed Aug. 28, 2007.

FIELD

The present invention relates to a method and associated system for restructuring data content based on various parameters.

BACKGROUND

Reordering specific data portions from a data stream typically comprises a complicated and inefficient process with little flexibility. A user wishing to transmit data in a specific order may be limited to only transmitting predetermined data portions of the data steam. The predetermined data portions from the data stream may not comprise data portions of interest to the user. Accordingly, there exists a need in the art to overcome at least some of the deficiencies and limitations described herein above.

SUMMARY

The present invention provides a restructuring method comprising: receiving, by a computing system from a first user, content data arranged in a first specified order, wherein said computing system comprises a memory system; receiving, by said computing system from said first user, a command for tagging portions of said content data according to various parameters; assigning, by said computing system in response to said command, identification tags to said portions of said content data, wherein each portion of said portions of said content data is assigned an associated identification tag of said identification tags, said identification tags comprising default identification tags; storing, by said computing system within said memory system, said portions of said content data and said identification tags; presenting, by said computing system to said first user, said identification tags; receiving, by said computing system from said first user, a selection of at least one of said identification tags; restructuring, by said computing system in response to said selection of said at least one of said identification tags, said content data into a second specified order; storing, by said computing system, said content data in said second specified order within said memory system; receiving, by said computing system from a second user, a request for viewing said content data; and presenting, by said computing system to said second user, said content data in said second specified order.

The present invention provides a computing system comprising a processor coupled to a computer-readable memory unit, said memory unit comprising instructions that when executed by the processor implement a data restructuring method, said method comprising: receiving, by said computing system from a first user, content data arranged in a first specified order, wherein said computing system comprises a memory system; receiving, by said computing system from said first user, a command for tagging portions of said content data according to various parameters; assigning, by said computing system in response to said command, identification tags to said portions of said content data, wherein each portion of said portions of said content data is assigned an associated identification tag of said identification tags, said identification tags comprising default identification tags; storing, by said computing system within said memory system, said portions of said content data and said identification tags; presenting, by said computing system to said first user, said identification tags; receiving, by said computing system from said first user, a selection of at least one of said identification tags; restructuring, by said computing system in response to said selection of said at least one of said identification tags, said content data into a second specified order; storing, by said computing system, said content data in said second specified order within said memory system; receiving, by said computing system from a second user, a request for viewing said content data; and presenting, by said computing system to said second user, said content data in said second specified order.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a data restructuring method, said method comprising: receiving, by said computing system from a first user, content data arranged in a first specified order, wherein said computing system comprises a memory system; receiving, by said computing system from said first user, a command for tagging portions of said content data according to various parameters; assigning, by said computing system in response to said command, identification tags to said portions of said content data, wherein each portion of said portions of said content data is assigned an associated identification tag of said identification tags, said identification tags comprising default identification tags; storing, by said computing system within said memory system, said portions of said content data and said identification tags; presenting, by said computing system to said first user, said identification tags; receiving, by said computing system from said first user, a selection of at least one of said identification tags; restructuring, by said computing system in response to said selection of said at least one of said identification tags, said content data into a second specified order; storing, by said computing system, said content data in said second specified order within said memory system; receiving, by said computing system from a second user, a request for viewing said content data; and presenting, by said computing system to said second user, said content data in said second specified order.

The present invention provides a computer program product, comprising a computer readable medium comprising a computer readable program code embodied therein, said computer readable program code adapted to implement data restructuring method within a computing system, said method comprising: receiving, by said computing system from a first user, content data arranged in a first specified order, wherein said computing system comprises a memory system; receiving, by said computing system from said first user, a command for tagging portions of said content data according to various parameters; assigning, by said computing system in response to said command, identification tags to said portions of said content data, wherein each portion of said portions of said content data is assigned an associated identification tag of said identification tags, said identification tags comprising default identification tags; storing, by said computing system within said memory system, said portions of said content data and said identification tags; presenting, by said computing system to said first user, said identification tags; receiving, by said computing system from said first user, a selection of at least one of said identification tags; restructuring, by said computing system in response to said selection of said at least one of said identification tags, said content data into a second specified order; storing, by said computing system, said content data in said second specified order within said memory system; receiving, by said computing system from a second user, a request for viewing said content data; and presenting, by said computing system to said second user, said content data in said second specified order.

The present invention advantageously provides a method and associated system capable of reordering specific data portions from a data stream.

DETAILED DESCRIPTION

Figure 1:
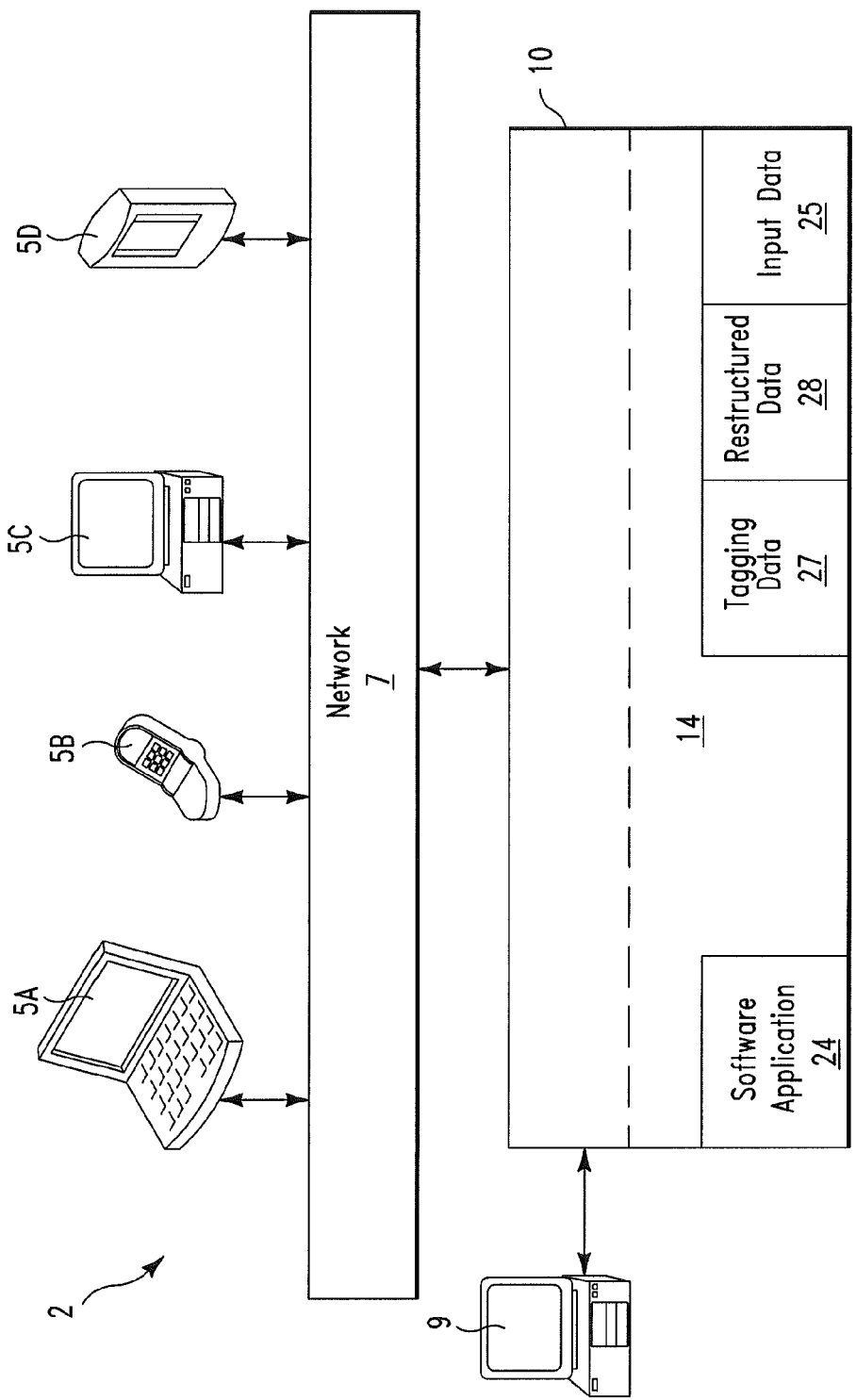
FIG. 1 illustrates a content restructuring system for restructuring input data according to various parameters, in accordance with embodiments of the present invention.

FIG. 1 illustrates a content restructuring system 2 for restructuring input data 25 according to various parameters, in accordance with embodiments of the present invention. Input data 25 may comprise any type of data such as, inter alia, a single document (e.g., word processing document, a PDF document, a web page, etc), multiple documents, an email, etc. Restructuring input data 25 may comprise:
1. Rearranging a document such that specified portions of the document (e.g., paragraphs, sentences, etc) are placed in a specified order.
2. Rearranging a document such that only specified portions of the document (e.g., paragraphs, sentences, etc) are viewable by a second user.
3. Rearranging a plurality of documents such that each of the plurality of documents is placed in a specified order for viewing by a second user.
4. Rearranging a plurality of documents such that only some documents of the plurality of documents are viewable by a second user.

The document(s) may be rearranged by a user that generates the document or by a user that receives the document from a user that generates the document. Content restructuring system 2 provides dynamic content restructuring and management capabilities. System 2 allows a user to:
1. Input a document(s) into system 2.
2. Visually scan the document(s) and identify keywords that match a set of predefined tags (e.g., take user input to learn new tags specific to the document(s)). A tag comprises a method to denote a topic (i.e., a subject to be discussed or addressed in a general or a specified method) to be categorized.
3. Accept user input for specified weighting applied to the tags.

Based on this the document(s) and the predefined tags, system 2 allows the user to restructure the document(s) based on any combination of the following parameters:
1. Dynamic restructuring of the document(s) based on tagged elements such as, topic, category (i.e., a grouping system of said item based on commonality or similarities determined by a user or specified by a specific role), team or workgroup, user's role (i.e., a set of connected behaviors or actions that are performed by a person, team, or group in a specific context), user's responsibility, or low level task description.
2. Dynamic restructuring of the document(s) based on a topic predefined priority or rating (i.e., a severity level that takes precedence over other severity levels).
3. Dynamic restructuring of the document(s) based on a fragment level.
4. Dynamic creation of the document(s) based on audience's (i.e., a second user) interest.
5. Dynamic creation of table of contents (TOC) based on the user's selection on topic for restructuring.

Once tags are defined and stored in repository, a user may automate system 2 by:
1. Dynamically generating documents.
2. Storing many sections of web content.
3. Dynamically generating web page(s) by pulling relevant content sections and composing a document based on specified criteria such as, inter alia, a web site visitor's navigation path, preference, etc.

System 2 additionally allows an administrator to submit authorization to allow the user to restructure the document(s). The authorization may be permitted via, instant messaging, email, etc.

System 2 of FIG. 1 comprises a plurality of input/output (I/O) devices 5A . . . 5D connected to a computing system 10 through a network 7. I/O devices 5A . . . 5D may comprise any type of I/O device such as, inter alia, a notebook computer 5A, a cellular telephone 5B, a desktop computer 5C, a personal digital assistant (PDA) 5D, etc. Network 7 may comprise any type of network including, inter alia, a local area network, (LAN), a wide area network (WAN), the Internet, etc. Additionally, system 2 comprises an administrator terminal 9. Computing system 10 may comprise any type of computing system including, inter alia, a personal computer (PC), a server computer, a database computer, etc. Computing system 10 comprises a memory apparatus 14. Memory apparatus 14 comprises a software application 18, tagging data 27, restructured data 28, and input data 25. Software application 18 controls all functions related to:
1. Restructuring input data 25.
2. Authorizing a user to restructure input data 25.

Tagging data 27 comprises data related to predefined tags. A tag is defined herein as a data marker used to denote a topic to be categorized. Restructured data 28 comprises any of input data 25 that has been restructured. I/O devices 5A . . . 5D allow users to submit input data 25 into computing system 10 and access computing system 10 for restructuring input data 25. Administrator terminal 9 allows an administrator to authorize a restructured document.

Software application 18 allows for the following functionality with respect to restructuring input data 25:
1. Creation of topics by using tagging library that may be applied to document content for enabling dynamic rearrangement of the document. A priority level and rating may also be applied to each topic. This function is performed by a designer of the document.

2. Dynamic restructuring of the document based on tagged elements (e.g., topic, category, team or workgroup, person's role, person's responsibility or low level task description, etc).
3. Dynamic restructuring of a document based on a topic predefined priority or rating
4. Dynamic restructuring of a document based on a fragment level.
5. Dynamic creation of document based on an audience's (receiver of the document) interest (e.g., an administration guide, a user guide, a planning guide, a problem determination guide, etc). 6. Dynamic creation of a table of contents (TOC) based on a user's selection of a topic for restructuring.
7. Dynamic creation of a view comparison table based on user's selection of a topic for restructuring. For example, if a role is used for restructuring, software application 18 would enable a display comprising an administrator view and a system administrator view with prioritized sections. A user may further filter or restructure the document within each view.

Software application 18 allows for the following functionality with respect to allowing an administrator to authorize a restructuring process:

1. Extended control capability for the original document so that when a second user (i.e., receiving user) executes a drag-n-drop menu or selects sections to create a new document, the original author of the document may be notified of the change. Depending on a security setting, the original author of the document may be prompted to dynamically authorize the change in real-time and remotely from a remote location.
2. Rapid approval with instant message (IM) integration. An original author's information is embedded during a document creation process and therefore a modification process applied to tagged section(s) of the document may trigger an approval process via IM or email. Computing system 10 will parse an IM response or email subject line and apply the appropriate approval code and response to the documents across network 7. Computing system 10 may also integrate with computer telephony integration (CTI) in order to solicit a document restructuring approval using LAN or VOIP lines and translating a voice response.
3. Provides a separation of duty capability in order to comply with federal regulations and company security policies. For example, two approvers may be required, a person who made the modification may not be the approver for a particular document or section(s) of a document.
4. Provides a full audit capability. For example, logging essential data, a tags/field/section/document may be configurable by an administrator, storing a history trail of document modification and approval, including an archive utility at a database and document level, etc.

The following description (steps) illustrates an example of implementation for restructuring input data 25 according to various parameters:

1. A system administrator generates a set of tags that are relevant to documents uploaded into computing system 10. The tags are determined based on:
 a) Domain knowledge of the documents to uploaded into computing system 10.
 b) Consultation with users of the documents to uploaded into computing system 10.
2. A document author generates a document. He/she tags various sections of the document using the tags generated by the system administrator.
3. The document author uploads the document into computing system 10.
4. A document user selects a document on computing system 10 to view.
5. The document user is presented with a set of topics that he/she may be interested in.
6. The document user selects a first topic from the set of topics.
7. The document is restructured (i.e., by software application 18) based on the selection of the first topic and sections of the document are dynamically rearranged based on tags and the selection of the first topic.
7. The restructured document is presented to the document user.

The following description (steps) illustrates an example of implementation for sharing tagged input data 25 according to various parameters:

1. A first user A tags specific sections of a document 1.
2. A second user B tags specific sections of a document 2.
3. A third user C may access to both sets of tagged sections created by first user A and second user B and may create a document C comprising shared tagged sections without having to define new tags.

Figure 2:
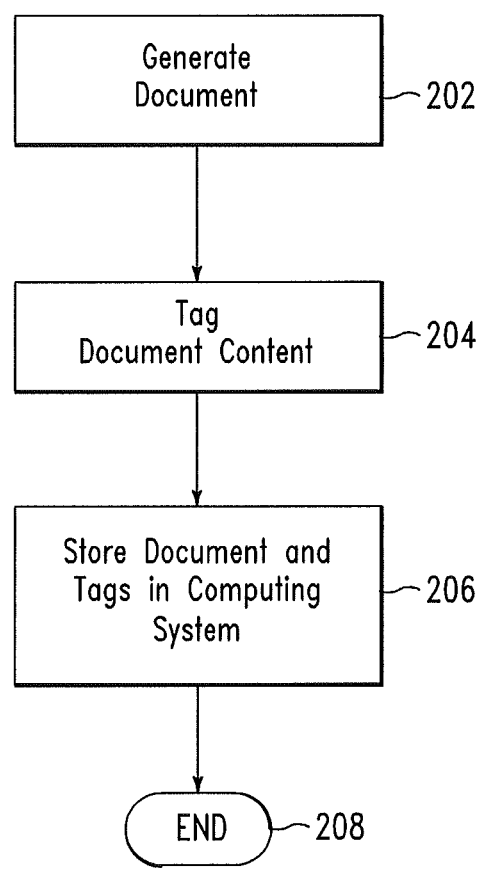
FIG. 2 illustrates a flowchart describing an overall algorithm used by the system of FIG. 1 for generating and tagging a document, in accordance with embodiments of the present invention.

FIG. 2 illustrates a flowchart describing an overall algorithm used by system 2 of FIG. 1 for generating and tagging a document, in accordance with embodiments of the present invention. In step 202, a user generates a document. In step 204, the user tags portions of the document according to various parameters. Parameters may include, inter alia, a user role, a priority, a topic of preference, a category, etc. Instep 206, the document and tags are stored in computing system 10 and the process terminates is step 208.

Figure 3:
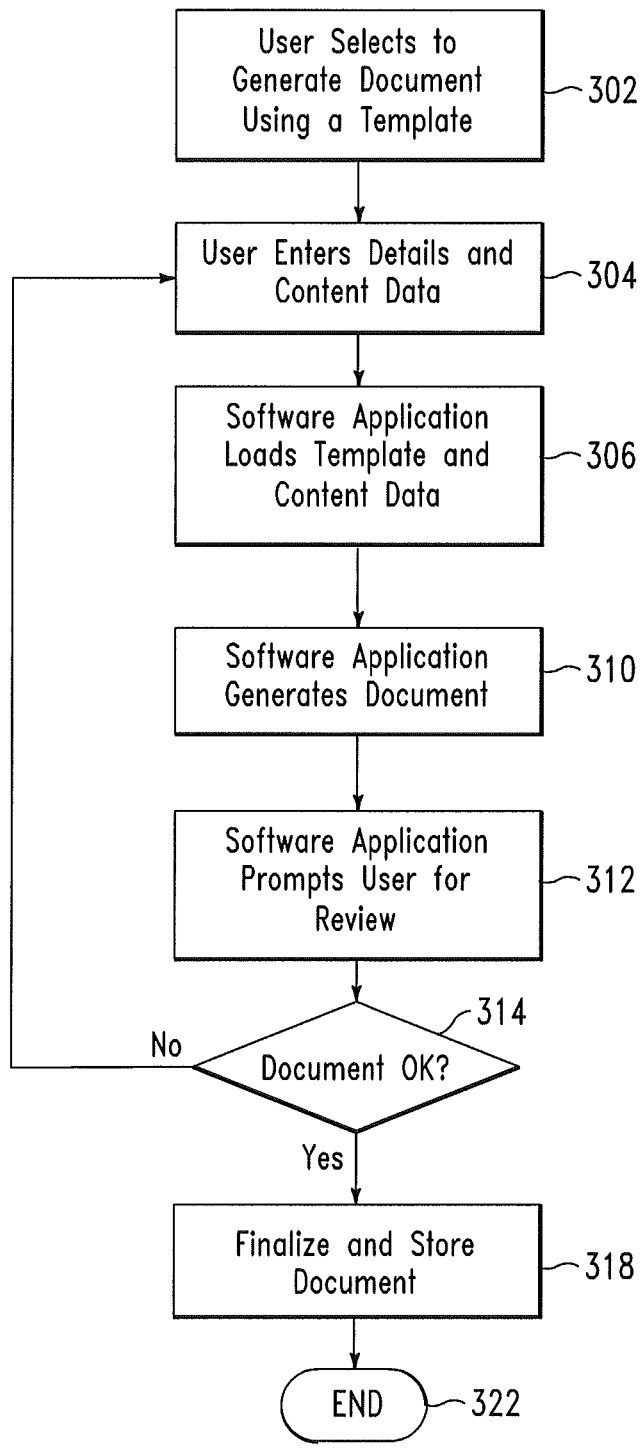
FIG. 3 illustrates a flowchart detailing a step of FIG. 2, in accordance with embodiments of the present invention.

FIG. 3 illustrates a flowchart detailing step 202 of FIG. 2, in accordance with embodiments of the present invention. In step 302, the user selects to generate the document using a template. In step 304, the user enters document details and document content data. Document details may include, inter alia, a specified template type, a company for the user, an arrangement for the content data, etc. In step 306, software application 18 loads the selected template and entered content data. In step 310, software application 18 generates the document using the selected template and entered content data. In step 312, software application 18 prompts the user to review the document. In step 314, the user determines if the document is ok (i.e., comprises correct content). If in step 314, the user determines that the document is ok then in step 318 the document is finalized and stored and the process ends in step 322. If in step 314, the user determines that the document is not ok, then step 304 is repeated.

Figure 4:
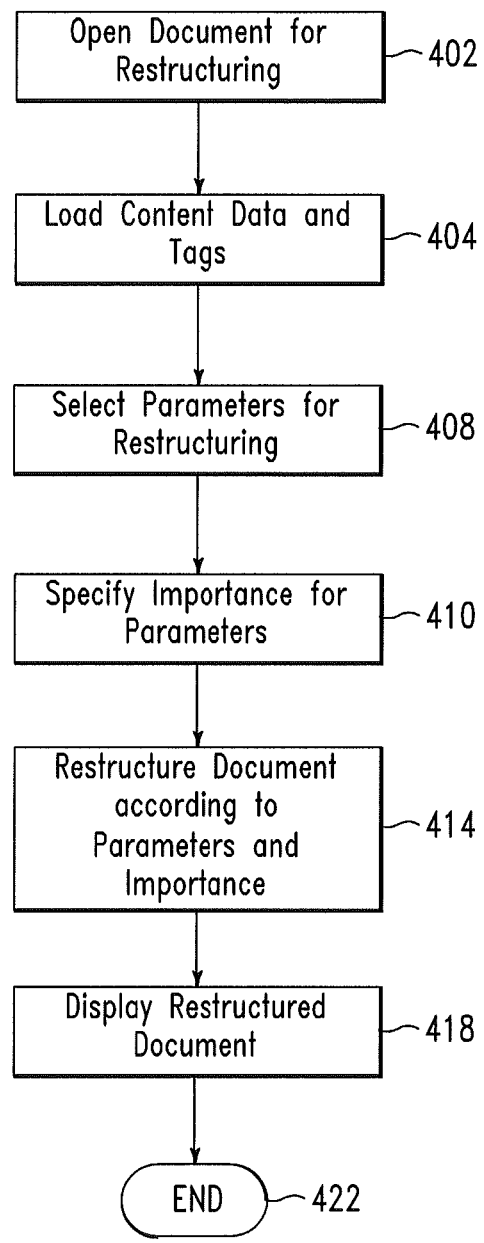
FIG. 4 illustrates a flowchart describing an overall algorithm used by system of FIG. 1 for restructuring a document, in accordance with embodiments of the present invention.

FIG. 4 illustrates a flowchart describing an overall algorithm used by system 2 of FIG. 1 for restructuring a document, in accordance with embodiments of the present invention. In step 402, a document stored in computing system 10 is selected for restructuring. In step 404, content data from the document and the associated tags are loaded onto an I/O device (e.g., one of I/O devices 5A . . . 5D) being used by the user. In step 408, the user selects specified parameters for restructuring. The specified parameters may include a ranking or weight, specified topics, a role, content, task, category, etc. In step 410, the user ranks the parameters by importance. In step 414, software application 18 restructures the document according to the parameter selected in step 408 and the parameters ranked by importance in step 410. In step 418, the restructured document is displayed for the user and the process terminates in step 422.

Figure 5:
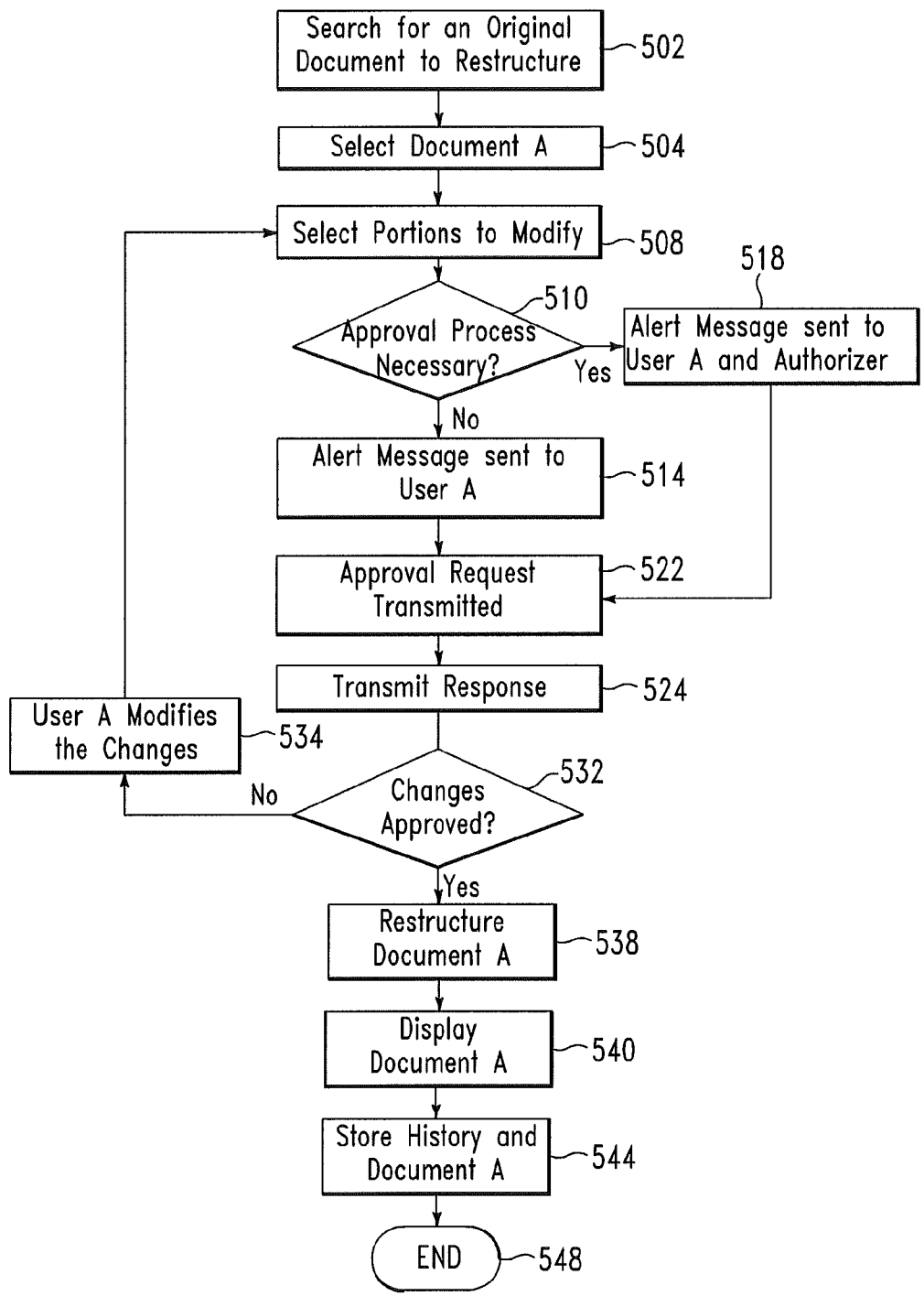
FIG. 5 illustrates a flowchart describing an overall algorithm used by the system of FIG. 1 for authorizing a restructuring of a document, in accordance with embodiments of the present invention.

FIG. 5 illustrates a flowchart describing an overall algorithm used by system 2 of FIG. 1 for authorizing a restructuring of a document, in accordance with embodiments of the present invention. In step 502, a user A searches computing system 10 and selects an original draft of a document A selected to modify and change. In step 504, the document A is selected and loaded onto an I/O device being used by the user. In step 508, user A uses a drag-n-drop method to restructure the document. In step 510, computing system 10 determines if a dynamic approval process is necessary.

If in step 510, computing system 10 determines that a dynamic approval process is not necessary then in step 514, an alert message specifying that a dynamic approval process is not necessary is transmitted (i.e., via email, IM, cell phone, etc.) to user A.

If in step 510, computing system 10 determines that a dynamic approval process is necessary then in step 518, an alert message specifying that a dynamic approval process is necessary and is transmitted (i.e., via email, IM, cell phone, etc.) to an authorizer and user A. The alert message generated in step 518 additionally highlights the changes to document A. In step 522, an approval request is transmitted to the authorizer and/or user A. In step 524, the authorizer and/or user transmits a response (i.e., approving or disapproving the restructuring of the document A) back to computing system 10. In step 532, computing system 10 determines if the authorizer and/or user A has approved the restructuring of document A.

If in step 532, computing system 10 determines that the authorizer and/or user A has not approved the restructuring of document A then in step 534, user A modifies the changes (i.e., the restructures document A again) and step 508 is repeated.

If in step 532, computing system 10 determines that the authorizer and/or user A has approved the restructuring of document A then in step 538, document A is restructured. In step 540, the restructured document A is displayed for user A and/or the authorizer. In step 544 the restructured document A and the restructuring history is stored in computing system 10 and the process terminates in step 548.

Figure 6:
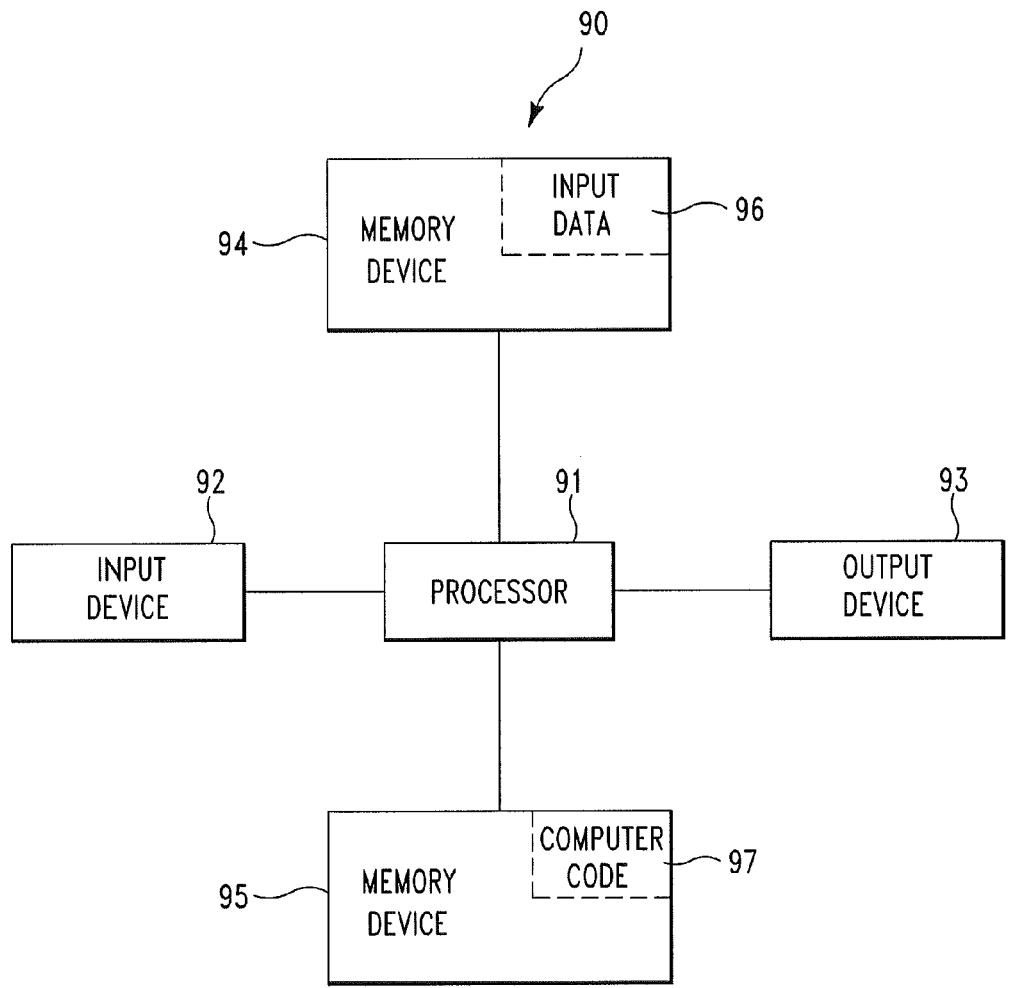
FIG. 6 illustrates a computer apparatus used for restructuring input data according to various parameters, in accordance with embodiments of the present invention.

FIG. 6 illustrates a computer apparatus 90 (e.g., computing system 10 of FIG. 1) used for restructuring input data according to various parameters, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for restructuring input data according to various parameters. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to restructure input data according to various parameters. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for restructuring input data according to various parameters. In another embodiment, the invention provides a business method that performs the process steps of the invention on a subscription, advertising, and/or fee basis. That is, a service provider, such as a Solution Integrator, could offer to restructure input data according to various parameters. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A restructuring method comprising:
   receiving, by a computing system from a first user, content data arranged in a first specified order, wherein said computing system comprises a memory system;
   receiving, by said computing system from said first user, a command for tagging portions of said content data according to various parameters, wherein said various parameters consist of a job role, a priority level, a ranking, and a task;
   assigning, by said computing system in response to said command, identification tags to said portions of said content data, wherein each portion of said portions of said content data is assigned an associated identification tag of said identification tags, said identification tags comprising default identification tags;
   storing, by said computing system within said memory system, said portions of said content data and said identification tags;
   presenting, by said computing system to said first user, said identification tags;
   receiving, by said computing system from said first user, a selection of at least one of said identification tags;
   notifying, by said computing system, an original author of said content data of said selection of at least one of said identification tags;
   authorizing, by said computing system in response to an authorization instant message from said original author of said content data, a restructuring process and a rearranging process associated with said content data, wherein said authorizing said restructuring process comprises:
- providing a separation of duty capability, associated with two different approvers, in order to comply with federal regulations and company security policies; and
- providing a full audit capability by: logging essential data, configuring a tags/field/section/document of said content data, and storing a history trail of document modification and approvals associated with said content data;

rearranging, by said computing system in response to said restructuring, said content data in a second specified order such that first specified portions and second specified portions of said content data are viewable by a second user, wherein said first specified portions and said second specified portions of said content data are not viewable by said first user, wherein said first specified portions comprise only specified sentences and specified paragraphs in a first document of said content data, and wherein each portion of said second specified portions is comprised by a different document of said content data;

generating, by said computing system, a table of contents describing said first specified portions and said second specified portions of said content data in said second specified order;

storing, by said computing system, said table of contents and said first specified portions and said second specified portions of said content data in said second specified order within said memory system;

generating, by said computing system, Web pages comprising said first specified portions and said second specified portions of said content data in said second specified order;

presenting, by said computing system to said second user, said table of contents;

presenting, by said computing system to said second user in response to selections within said table of contents, said Web pages comprising said first specified portions and said second specified portions of said content data in said second specified order;

presenting, by said computing system to a third user, said Web pages comprising said first specified portions and said second specified portions of said content data in said second specified order; and presenting, by said computing system to said third user, additional portions of said content data, wherein said additional portions of said content data have been tagged by said first user and said second user.

2. The method of claim 1, further comprising:
receiving, by said computing system from said second user, a request for viewing said identification tags;
retrieving, by said computing system, said identification tags from said memory system;
presenting, by said computing system to said second user, said identification tags;
receiving, by said computing system from said second user, a selection of a first identification tag of said identification tags;
retrieving, by said computing system from said memory system, a first portion of content data of said portions of said content data, said first portion of content data associated with said first identification tag; and
presenting, by said computing system to said second user, said first portion of content data.

3. The method of claim 2, further comprising:
requesting, by said computing system from an authorizing user, approval for presenting, said first portion of content data to said second user; and
receiving, by said computing system from said authorizing user, said approval for presenting said first portion of content data to said second user.

4. The method of claim 3, wherein said requesting approval for presenting said first portion of content data to said second user is performed using an instant message, and wherein said receiving said approval for presenting said first portion of content data to said second user is performed using an instant message.

5. The method of claim 1, further comprising:
requesting, by said computing system from an authorizing user, approval for performing said restructuring, and
receiving, by said computing system from said authorizing user, said approval for performing said restructuring.

6. The method of claim 1, wherein said content data is comprised by a single document.

7. The method of claim 1, wherein said content data is comprised by a plurality of documents and wherein each said portion of said portions of said content data is comprised by a different document of said plurality of documents.

8. The method of claim 1, further comprising:
presenting, by said computing system to said first user, a plurality of document creation templates;
receiving, by said computing system from said first user, a selection of a first document creation template of said document creation templates;
placing, by said computing system, said content data arranged in said second specified order into said first document creation template; and
generating by said computing system, a first document from said first document creation template comprising said content data arranged in said second specified order.

9. The method of claim 1, further comprising:
generating, by said computing system, a table of contents by using said at least one of said identification tags.

10. The method of claim 1, wherein said restructuring said content data into a second specified order is based on a fragment level.

11. A computing system comprising a computer processor coupled to a computer-readable memory unit, said memory unit comprising instructions that when executed by the computer processor implement a data restructuring method, said method comprising:
receiving, by said computer processor from a first user, content data arranged in a first specified order, wherein said computing system comprises a memory system;
receiving, by said computing system from said first user, a command for tagging portions of said content data according to various parameters, wherein said various parameters consist of a job role, a priority level, a ranking, and a task;
assigning, by said computing system in response to said command, identification tags to said portions of said content data, wherein each portion of said portions of said content data is assigned an associated identification tag of said identification tags, said identification tags comprising default identification tags;
storing, by said computing system within said memory system, said portions of said content data and said identification tags;

presenting, by said computing system to said first user, said identification tags;
receiving, by said computing system from said first user, a selection of at least one of said identification tags;
notifying, by said computing system, an original author of said content data of said selection of at least one of said identification tags;
authorizing, by said computing system in response to an authorization instant message from said original author of said content data, a restructuring process and a rearranging process associated with said content data, wherein said authorizing said restructuring process comprises:
  providing a separation of duty capability, associated with two different approvers, in order to comply with federal regulations and company security policies; and
  providing a full audit capability by: logging essential data, configuring a tags/field/section/document of said content data, and storing a history trail of document modification and approvals associated with said content data;
rearranging, by said computing system in response to said restructuring, said content data in a second specified order such that first specified portions and second specified portions of said content data are viewable by a second user, wherein said first specified portions and said second specified portions of said content data are not viewable by said first user, wherein said first specified portions comprise only specified sentences and specified paragraphs in a first document of said content data, and wherein each portion of said second specified portions is comprised by a different document of said content data;
generating, by said computing system, a table of contents describing said first specified portions and said second specified portions of said content data in said second specified order;
storing, by said computing system, said table of contents and said first specified portions and said second specified portions of said content data in said second specified order within said memory system;
generating, by said computing system, Web pages comprising said first specified portions and said second specified portions of said content data in said second specified order;
presenting, by said computing system to said second user, said table of contents;
presenting, by said computing system to said second user in response to selections within said table of contents, said Web pages comprising said first specified portions and said second specified portions of said content data in said second specified order;
presenting, by said computing system to a third user, said Web pages comprising said first specified portions and said second specified portions of said content data in said second specified order; and
presenting, by said computing system to said third user, additional portions of said content data, wherein said additional portions of said content data have been tagged by said first user and said second user.

12. The computing system of claim 11, wherein said method further comprises:
requesting, by said computing system from an authorizing user, approval for presenting, said first portion of content data to said second user; and
receiving, by said computing system from said authorizing user, said approval for presenting said first portion of content data to said second user.

13. The computing system of claim 12, wherein said requesting approval for presenting said first portion of content data to said second user is performed using an instant message, and wherein said receiving said approval for presenting said first portion of content data to said second user is performed using an instant message.

14. The computing system of claim 11, wherein said method further comprises:
requesting, by said computing system from an authorizing user, approval for performing said restructuring, and
receiving, by said computing system from said authorizing user, said approval for performing said restructuring.

15. The computing system of claim 11, wherein said content data is comprised by a single document.

16. The computing system of claim 11, wherein said content data is comprised by a plurality of documents and wherein each said portion of said portions of said content data is comprised by a different document of said plurality of documents.

17. The computing system of claim 11, wherein said method further comprises:
presenting, by said computing system to said first user, a plurality of document creation templates;
receiving, by said computing system from said first user, a selection of a first document creation template of said document creation templates;
placing, by said computing system, said content data arranged in said second specified order into said first document creation template; and
generating by said computing system, a first document from said first document creation template comprising said content data arranged in said second specified order.

18. The computing system of claim 11, wherein said method further comprises:
generating, by said computing system, a table of contents by using said at least one of said identification tags.

19. A process for supporting computer infrastructure, said process comprising providing at least one support service for at least one of creating, integrating, hosting, maintaining, and deploying computer-readable code in a computing system, wherein the code in combination with the computing system is capable of performing a data restructuring method, said method comprising:
receiving, by said computing system from a first user, content data arranged in a first specified order, wherein said computing system comprises a memory system;
receiving, by said computing system from said first user, a command for tagging portions of said content data according to various parameters, wherein said various parameters consist of a job role, a priority level, a ranking, and a task;
assigning, by said computing system in response to said command, identification tags to said portions of said content data, wherein each portion of said portions of said content data is assigned an associated identification tag of said identification tags, said identification tags comprising default identification tags;
storing, by said computing system within said memory system, said portions of said content data and said identification tags;
presenting, by said computing system to said first user, said identification tags;
receiving, by said computing system from said first user, a selection of at least one of said identification tags;

notifying, by said computing system, an original author of said content data of said selection of at least one of said identification tags;

authorizing, by said computing system in response to an authorization instant message from said original author of said content data, a restructuring process and a rearranging process associated with said content data, wherein said authorizing said restructuring process comprises:

provihiding a separation of duty capability, associated with two different approvers, in order to comply with federal regulations and company security policies; and providing a full audit capability by: logging essential data, configuring a tags/field/section/document of said content data, and storing a history trail of document modification and approvals associated with said content data;

rearranging, by said computing system in response to said restructuring, said content data in a second specified order such that first specified portions and second specified portions of said content data are viewable by a second user, wherein said first specified portions and said second specified portions of said content data are not viewable by said first user, wherein said first specified portions comprise only specified sentences and specified paragraphs in a first document of said content data, and wherein each portion of said second specified portions is comprised by a different document of said content data;

generating, by said computing system, a table of contents describing said first specified portions and said second specified portions of said content data in said second specified order;

storing, by said computing system, said table of contents and said first specified portions and said second specified portions of said content data in said second specified order within said memory system;

generating, by said computing system, Web pages comprising said first specified portions and said second specified portions of said content data in said second specified order;

presenting, by said computing system to said second user, said table of contents;

presenting, by said computing system to said second user in response to selections within said table of contents, said Web pages comprising said first specified portions and said second specified portions of said content data in said second specified order;

presenting, by said computing system to a third user, said Web pages comprising said first specified portions and said second specified portions of said content data in said second specified order; and presenting, by said computing system to said third user, additional portions of said content data, wherein said additional portions of said content data have been tagged by said first user and said second user.

20. A computer program product, comprising a computer readable storage device storing a computer readable program code, said computer readable program code adapted to implement a: data restructuring method within a computing system, said method comprising:

receiving, by said computing system from a first user, content data arranged in a first specified order, wherein said computing system comprises a memory system;

receiving, by said computing system from said first user, a command for tagging portions of said content data according to various parameters, wherein said various parameters consist of a job role, a priority level, a ranking, and a task;

assigning, by said computing system in response to said command, identification tags to said portions of said content data, wherein each portion of said portions of said content data is assigned an associated identification tag of said identification tags, said identification tags comprising default identification tags;

storing, by said computing system within said memory system, said portions of said content data and said identification tags;

presenting, by said computing system to said first user, said identification tags;

receiving, by said computing system from said first user, a selection of at least one of said identification tags;

notifying, by said computing system, an original author of said content data of said selection of at least one of said identification tags;

authorizing, by said computing system in response to an authorization instant message from said original author of said content data, a restructuring process and a rearranging process associated with said content data, wherein said authorizing said restructuring process comprises:

providing a separation of duty capability, associated with two different approvers, in order to comply with federal regulations and company security policies; and providing a full audit capability by: logging essential data, configuring a tags/field/section/document of said content data, and storing a history trail of document modification and approvals associated with said content data;

rearranging, by said computing system in response to said restructuring, said content data in a second specified order such that first specified portions and second specified portions of said content data are viewable by a second user, wherein said first specified portions and said second specified portions of said content data are not viewable by said first user, wherein said first specified portions comprise only specified sentences and specified paragraphs in a first document of said content data, and wherein each portion of said second specified portions is comprised by a different document of said content data;

generating, by said computing system, a table of contents describing said first specified portions and said second specified portions of said content data in said second specified order;

storing, by said computing system, said table of contents and said first specified portions and said second specified portions of said content data in said second specified order within said memory system;

generating, by said computing system, Web pages comprising said first specified portions and said second specified portions of said content data in said second specified order;

presenting, by said computing system to said second user, said table of contents;

presenting, by said computing system to said second user in response to selections within said table of contents, said Web pages comprising said first specified portions and said second specified portions of said content data in said second specified order;

presenting, by said computing system to a third user, said Web pages comprising said first specified portions and said second specified portions of said content data in said second specified order; and presenting, by said computing system to said third user, additional portions of said content data, wherein said additional portions of said content data have been tagged by said first user and said second user.

\* \* \* \* \*